United States Patent [19]

Nikolaus et al.

[11] Patent Number: 5,146,812
[45] Date of Patent: Sep. 15, 1992

[54] ARRANGEMENT AND METHOD FOR OPERATING A CONTINUOUSLY VARIABLE DRIVE UNIT IN A MOTOR VEHICLE

[75] Inventors: Heinrich Nikolaus, Hamburg; Robert Paton, Passau, both of Fed. Rep. of Germany

[73] Assignee: Zahnradfabrik Friedrichshafen AG, Friedrichshafen, Fed. Rep. of Germany

[21] Appl. No.: 656,044

[22] PCT Filed: Aug. 12, 1989

[86] PCT No.: PCT/EP89/00957

§ 371 Date: Feb. 13, 1991

§ 102(e) Date: Feb. 13, 1991

[87] PCT Pub. No.: WO90/02059

PCT Pub. Date: Mar. 8, 1990

[30] Foreign Application Priority Data

Aug. 17, 1988 [DE] Fed. Rep. of Germany ....... 3827861

[51] Int. Cl.$^5$ .............................................. F16H 47/04
[52] U.S. Cl. ........................................ 74/858; 74/880; 74/872
[58] Field of Search ............. 475/77, 76, 72, 80; 74/857, 858, 859, 860, 861, 872, 880

[56] References Cited

U.S. PATENT DOCUMENTS

| | | | |
|---|---|---|---|
| 3,298,251 | 1/1967 | Moss | 475/77 |
| 4,481,844 | 11/1984 | Ironside et al. | 74/859 X |

FOREIGN PATENT DOCUMENTS

| | | | |
|---|---|---|---|
| 234136 | 9/1987 | European Pat. Off. | |
| 2307100 | 9/1974 | Fed. Rep. of Germany | 475/76 |
| 3512523 | 11/1986 | Fed. Rep. of Germany | |
| 3839462 | 5/1990 | Fed. Rep. of Germany | 74/859 |
| 58-156751 | 9/1983 | Japan | 475/77 |
| 2066429 | 7/1981 | United Kingdom | 475/76 |

*Primary Examiner*—Richard Lorence
*Assistant Examiner*—William O. Trousdell
*Attorney, Agent, or Firm*—Herbert Dubno

[57] ABSTRACT

Arrangement and method for operating a continuously variable drive unit of a motor vehicle with a controllable internal combustion engine and a hydrostatic-mechanical power split transmission and a control device which, near the gear-shift points S1 or S2 at an approximately constant rotational speed of the output shaft of the power split transmission, reduces the speed $n_{mot}$ of the internal combustion engine starting from $n_1$ and accelerates the resetting motion PHI or the swash plate up to the shift point, resets the motion PHI of the swash plate by a calculated load-dependent value K during gear shifting, and, in the new gear range at a further decreasing speed of the internal combustion engine and accelerated resetting of the swash plate exits the area close to the shift point with almost constant rotational speed of the output shaft of the transmission and then, at a constant PHI angle of the swash plate, the rotational speed of the output shaft is increased to the previous level $n_1$ by increasing the speed of the internal combustion engine.

8 Claims, 2 Drawing Sheets

ARRANGEMENT AND METHOD FOR OPERATING A CONTINUOUSLY VARIABLE DRIVE UNIT IN A MOTOR VEHICLE

FIELD OF THE INVENTION

The invention relates to an arrangement and a method for operating a continuously variable drive unit for motor vehicles with a controllable internal combustion engine and a hydrostatic mechanical power split transmission with continuously variable transmission ratio.

THE RELATED ART

From the patent document (DE 35 12 523) is known a continuously variable power split compound load-shifting transmission with group shifting. The transmission consists of two gear subgroups. One of them is a continuously variable power split linkage with several shafts. The other gear subgroup is a gear-shift mechanism with a speed group and several auxiliary gears which act upon the main drive shaft. Both linkage shafts alternately actuate the gear-shift mechanism. The gear shifts occur free of load at synchronous rotational speeds and without interruption of the traction power. The transmission works like a continuous transmission with a large range of controller output and makes possible operation of an internal combustion engine of a vehicle along a characteristic curve for minimal fuel consumption thereby achieving fuel economy.

Such hydrostatic-mechanical power split transmissions for motor vehicles are impaired by high losses under certain operational circumstances, since the efficiency of the hydrostatic branch decreases in cases of high delivery volumes between primary unit and secondary unit. The high pressures occurring in the hydrostatic branch at large delivery volumes of the primary unit, combined with the high rotational speeds transmitted by the internal combustion engine to the primary unit, lead to high losses, early wear and to heavy noise emission of the transmission.

Since the output fraction of the hydrostatic branch at large delivery volumes of the primary unit is relatively large with respect to the total power flow through the power split transmission, the lowered efficiency of the hydrostatic branch has a very disadvantageous effect on the total output of the power split transmission.

During the gear-shift process over the entire speed range in the mechanical branch of a hydrostatic-mechanical power split transmission, there occurs as a rule in the hydrostatic branch a load combination with the large delivery volume of the primary unit and the high pressures. Also during the gear-shift process, the transmission output shaft is separated from one of the linkage shafts of the linkage gearing and is connected to another linkage shaft. This process takes places at synchronous rotational speeds of the involved linkage shafts. The linkage shafts are connected via clutches to the output shaft of the transmission, whereby overcutting occurs during the gear-change process, with a rigid transmission ratio existing between the hydrostatic and the mechanical transmission branches The operation of the power split transmission under load leads to leakage losses in the hydrostatic branch. In order to compensate these losses, a modified delivery volume of the primary unit has to be preestablished, in order to reach a certain speed of the input shaft driven by the secondary unit. As a consequence, in order to reach a synchronous speed of the linkage shaft to be engaged, the angle of the swash plate of the primary unit in the hydrostatic branch has to be variably set, depending on the rotational speed existing at the moment at the output shaft of the transmission.

In the traction or thrust operation of the drive unit the swash plate of the primary unit has to be set at a larger or smaller angle, in order to bring the secondary unit to the rotational speed required for reaching the gear-shift point.

The alteration of the transmission ratio in the mechanical branch before and after the shifting process determines the torque difference which acts upon the hydrostatic branch before and after the shifting process. If the angle of the swash plate of the primary unit required for reaching a gear-shift point is maintained after the shifting process has taken place, the delivery volume of the primary unit does not correspond to the delivery volume required for the newly transmitted torque. When the different requirements in the delivery volumes in the hydrostatic branch before and after the gear-shift point are ignored, this can lead to noticeable shocks of the entire system connected to the drive unit, to a lowered efficiency of the drive unit and increased wear, particularly of the clutches of the power split transmission.

It is the object of the invention to create an arrangement and a method which improve the efficiency of a power split transmission in the range of its gear-shift points and reduce wear and tear.

SUMMARY OF THE INVENTION

According to the invention this problem is solved with a control device that reduces to a lower speed the engine speed $n_1$ in the internal combustion engine, before a transmission ratio in the power split transmission is reached at which the secondary unit has a maximum rotational speed. Moreover, the setting signal for a swash plate in the primary unit is changed in such a manner that, at a decreasing speed of the internal combustion engine, almost constant rotational speeds are maintained at an output shaft of the transmission. After the shift point has been reached, the control device changes the setting signal for the swash plate of the primary unit by a value which is calculated from the difference of the highest setting signal $I_{actual}$, a preselected setting signal $I_{target}$ and the transmission ratio of the mechanical branch at the gear-shift point. After the shifting process has been concluded, the control device further lowers the speed (rpm) of the internal combustion engine and changes the setting signal for the swash plate so that the rotational speed of the transmission's output shaft continues to remain almost constant. Thereafter the rotational speed of the transmission's output shaft, at a constant transmission ratio, is altered by increasing the speed of the internal combustion engine, until the rotational speed $n_1$ is reached again and the further changes in the rotational speed of the output shaft, at a constant speed $n_1$ of the internal combustion engine, take place through the changes of the transmission ratio.

The arrangement of the invention and the method for operating the drive unit achieve the advantage that the working range near the shift point with a low efficiency of the power split transmission is traversed in a short period of time at a generally low input speed from the internal combustion engine, so that the power losses and the wear of the power split transmission, particularly of the clutches, are lowered.

A special contribution to the improvement of the invention has the adjustment of the delivery volume of the primary unit to the actual torque existing in the hydrostatic branch before and after the gear-switch point.

Electronic control devices have a particularly good ratio of price/performance and make possible in an advantageous way the combination of the control functions according to the invention with the driving programs.

If the engine is operated at for instance 90% of its peak power adjustment of the engine speed can be eliminated thereby preventing a possible decrease of the rotational speed resulting in a lower power output of the internal combustion engine.

Although the invention is described with respect to one embodiment, the invention is broader in scope than such embodiment. In light of the features of the invention presented, various modifications will be suggested to one skilled in the art, all of which are within the spirit and purview of this invention.

BRIEF DESCRIPTION OF THE DRAWING

The above and other objects, features and advantages of our invention will become more readily apparent from the following description, reference being made to the accompanying drawing in which.

DETAILED DESCRIPTION

Figure 1:
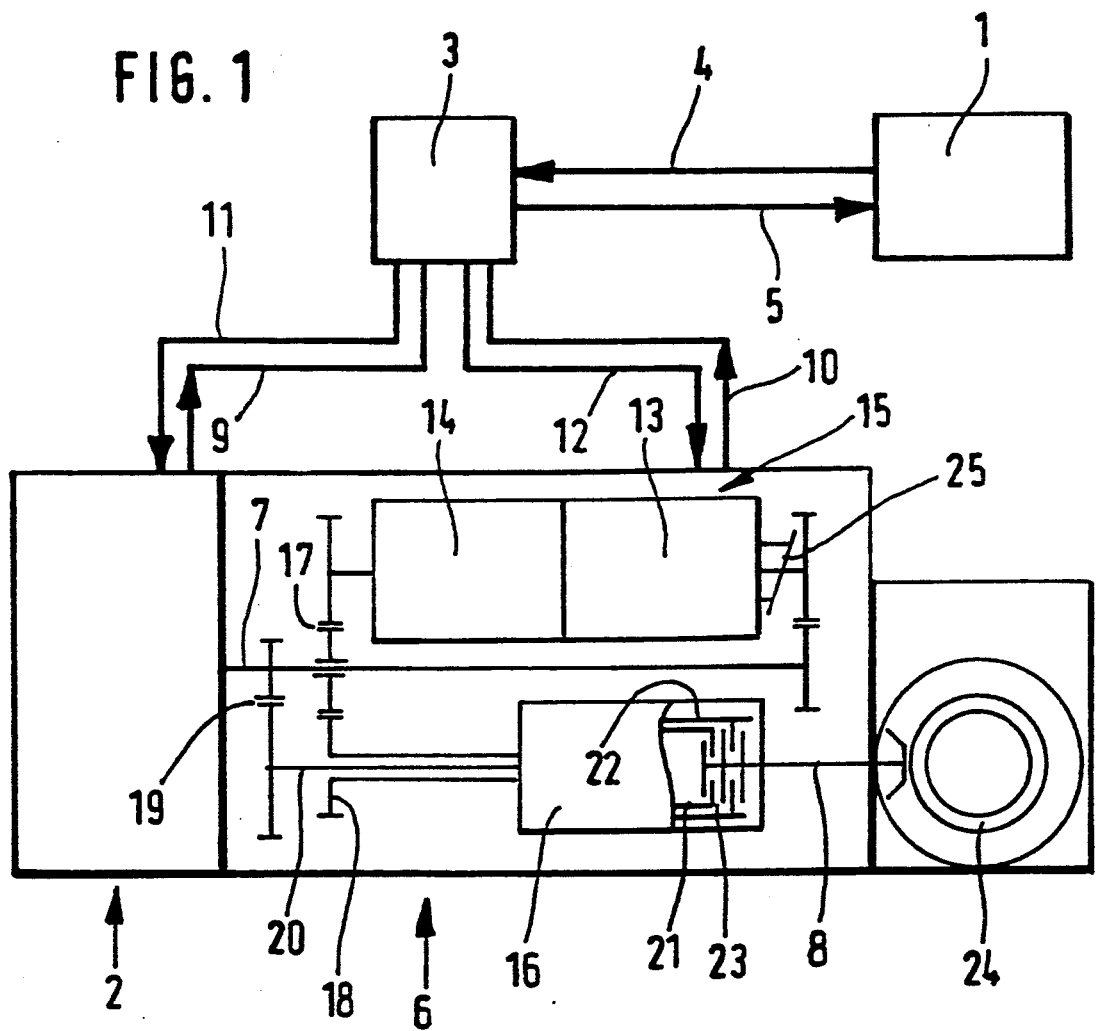
FIG. 1 is a schematic diagram of the transmission arrangement according to the invention.

By means of a selector switch 1, a freely selectable speed and an economy or a full-load program for the operation of an internal combustion engine 2 is set at engine speeds with consumption values or at rated speed. A control device 3 exchanges electrical signals, such as control signals and feedback with the selector switch 1 via lines 4, 5. A continuously variable drive unit consists of the controllable internal combustion engine 2 of the usual construction, which drives a hydrostatic-mechanical power split transmission 6. Between the internal combustion engine 2 and the power split transmission 6, there is no shiftable clutch. The electronic control device 3, for instance, automatically controls the speed of the internal combustion engine 2 and the transmission ratio of the continuously variable hydrostatic-mechanical power split transmission 6, so that the preselected speed is reached. For this purpose, measured-value sensors not shown in the drawing are provided at an input shaft 7 driven accordingly to the engine speed and at a transmission output shaft 8, which transmit the rotational speeds of the shafts to the control device 3, via lines 9, 10. The control device 3 compares the measured speed values with the control signals from selector switch 1. Depending on the drive programs stored in the control device 3, control signals are sent by the control device 3 via lines 11, 12, to the internal combustion engine 2 and the power split transmission 6.

The internal combustion engine 2 is adjusted in the usual manner, by throttling the air-suction cross section or the fuel injection and primarily operated at a constant engine speed, for instance the speed with the lowest consumption rates.

The transmission ratio of the hydrostatic-mechanical power split transmission 6 is continuously varied, by continuously influencing the delivery volume of a primary unit 13 and thereby the rotational speed of a secondary unit 14 of a hydrostatic branch 15 of the power split transmission 6. The primary unit 13 in the hydrostatic transmission branch 15 is directly driven by the controllable internal combustion engine 2 and rotates with a speed which is proportional to the speed of the internal combustion engine 2.

The hydrostatic transmission branch 15 is connected with the mechanical transmission branch 16 over a reduction gear 17 and a hollow shaft 18. The continuous transmission range of the hydrostatic transmission branch 15 in the power split transmission 6 is multiplied by gear elements, for instance planetary gears in the mechanical transmission branch 16 of the power split transmission 6.

The internal combustion engine 2 drives via a reduction gear 19 and a drive shaft 20 the mechanical transmission branch 16, which contains at least one linkage gearing (not shown). Linkage shafts 21, 22 of the linkage gears are driven with continuously variable rotational speeds, resulting from the summation of the continuously variable speeds of the secondary unit 14 and of the constant rotational speed of the shaft 20. Clutches 23 connect alternately one of the linkage shafts 21 or 22 with the transmission output shaft 8, which drives a rear axle 24. During the shifting operation, at least for a short time both linkage shafts 21 and 22 are connected via the clutch 23 with the transmission output shaft 8.

Figure 2:
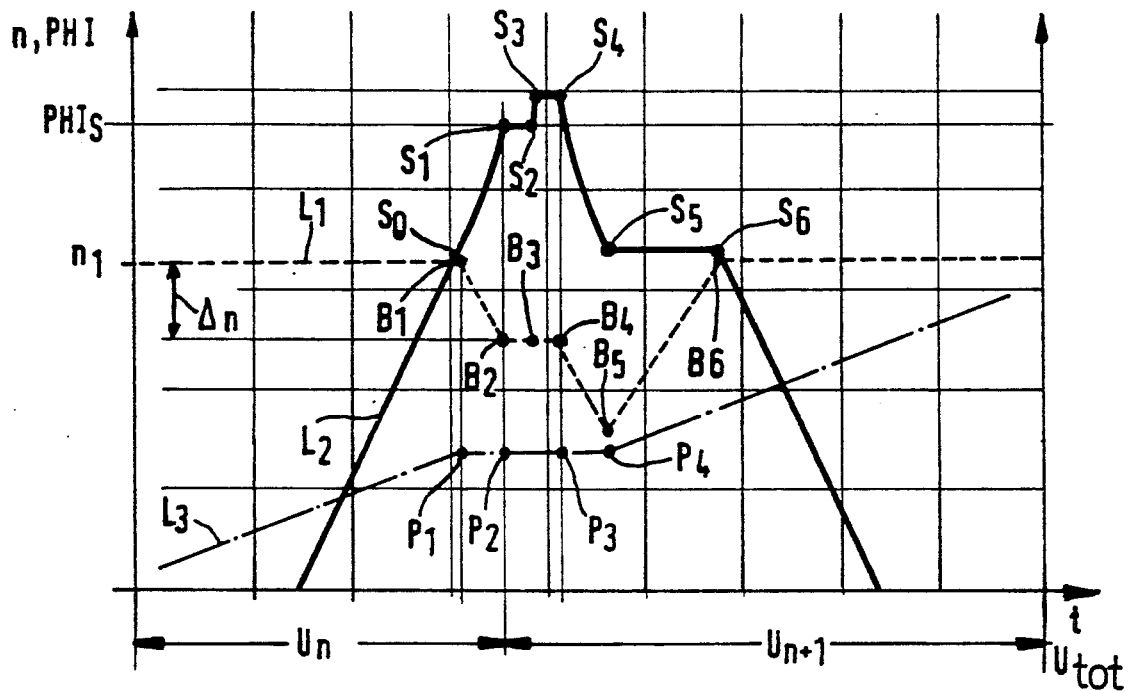
FIG. 2 is a graph showing the characteristic curve of the speed of the internal combustion engine and the time-dependent adjustment of the swash plate in the power split transmission.

FIG. 2: Engaging one of the shift points according to the invention. The internal combustion engine 2 of the drive unit runs primarily with constant speed $n_{mot}=n_1$ corresponding to the characteristic line L1. The preselected speed is reached by changing the transmission ratio (line L2) of the power split transmission 6. The line L3 characterizes the course of the rotational speed at the transmission output shaft 8. In the mechanical transmission branch 16 in the speed range the transmission ratio $U_n$ is constant. Between the gear-shift points, the transmission ratio of the power split transmission 6 is changed by resetting the swash plate 25 of the primary unit 13 in the hydrostatic branch 15 almost linearly with the time t. In the vicinity of a gear-shift point of the mechanical branch 16 of the power split transmission 6, at a rotational speed of the output shaft 8 of the transmission 6 of for instance 90% of the rotational speed at the gear-shift point in the mechanical branch 16, the control signal of the control device 3 for the rotational speed $n_1$ of the internal combustion engine 2 is lowered by $\Delta n$. At the same time the control signal for the swash plate 25 of the primary unit 13 of the hydrostatic branch 15 is accelerated by a square function with respect to time and is reset towards the deflection angle $PHI_s$ from S0 to S1. At S1, synchronous speeds of the linkage shafts of two neighboring speed ranges are reached.

The control signals for the speed lowering of the internal combustion engine and for the resetting of the swash plate 25 are so attuned to each other that the rotational speed of the output shaft 8 of the transmission 6 remains almost constant during this operation, on the line L3, P1-P2. When the engine speed of the internal combustion engine 2 is lowered by $\Delta n$, the shift point S1 of the power split transmission 6 is reached at a synchronous rotational speed $n_s$, which is lower by $\Delta n$ multiplied by a transmission-dependent factor.

The linkage shaft 22 of the next speed range with the transmission ratio $U_{n+1}$ in the mechanical branch 16 is connected at the gear-shift point S1 with the linkage shaft 21 via clutch 23, and this way the linkage gear and therewith the transmission 6 run as a rigid unit. In the first phase of the shifting operation, the rotational speed of the internal combustion engine 2 remains constant, see line L1, B1–B3, the total transmission ratio of the transmission 6 $U_{tot}=U_n=U_{n+1}=$constant, see line L2, S1–S2, and the control device 3 establishes a correction value for the resetting of the swash plate 25 of the primary unit 13 according to the method represented in FIG. 3.

The correction of the adjustment of the swash plates 25 from S2 to S3 is followed by a further short phase S3 to S4 on the line L3, while the linkage shafts 21 and 22 of both speed ranges continue to remain commonly connected to the rear axle 24. The rpm of the internal combustion engine 2 remains constant, see line L1, B3–B4. At S4, the linkage shaft 21 is disengaged for the speed range with the transmission ratio $U_n$ in the mechanical branch 16 and the swash plate 25 is reset, accelerated from S4 towards S5 with a square function with respect to time from the area of the largest deflection of the swash plate to a smaller angle PHI and higher transmission ratio $U_{tot}$ of the transmission 6. The accelerated backswing of the swash plate 25 is supported by a further decreasing speed of the internal combustion engine, see line L1 from B4–B5, so that altogether the rotational speed of the output shaft 8 remains constant, see line L3, from P3–P4. If the deflection of the swash plate 25 of the primary unit 13 has reached an angle PHI close to the maximum deflection angle $PHI_{max}$, the swash plate 25 is fixed in this position from S5 to S6 on the line L2, and the rotational speed of the output shaft 8 of the transmission 6 starts again to climb from P4, see line L3, since the speed $n_{mot}$ of the internal combustion engine 2 is raised again to the level $n_1$ before the onset of the shift operation from B5 to B6 on the line L1.

Figure 3:
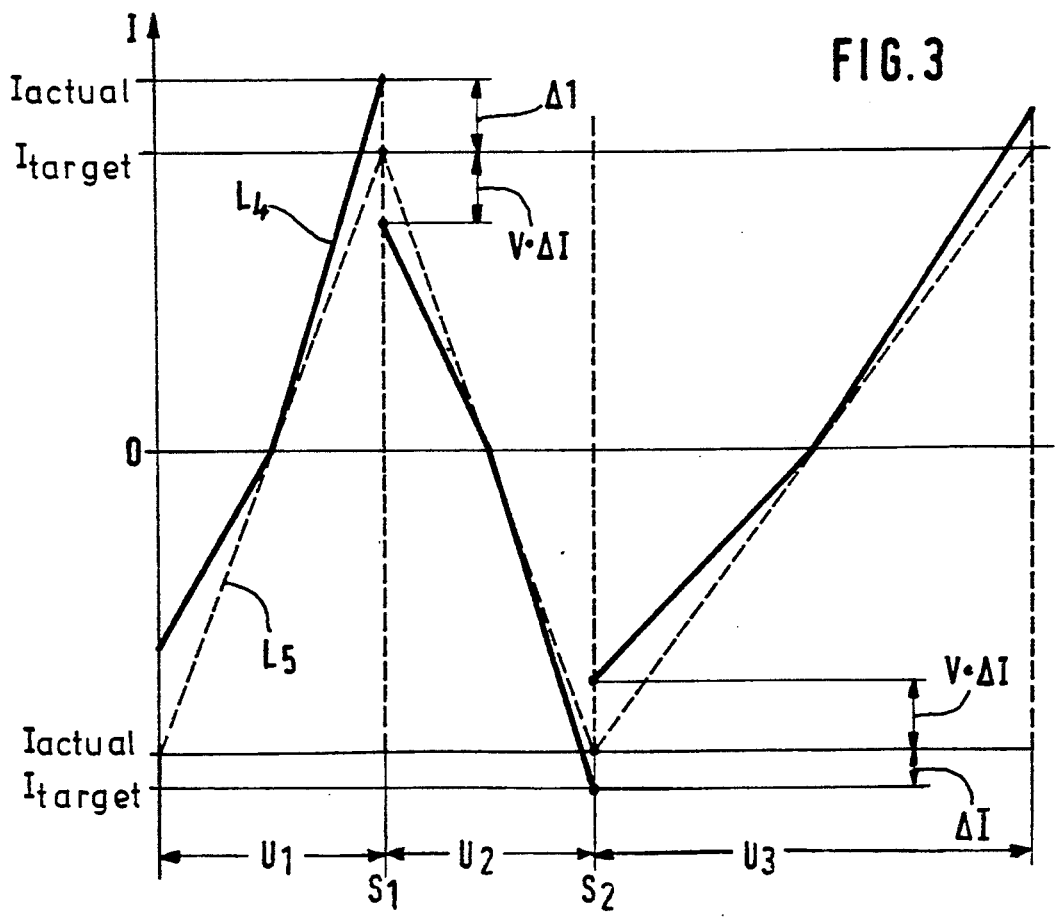
FIG. 3 is a graph showing the actual and the ideal curve of the angle of traverse of the adjustment unit in the hydrostat over the entire speed range and the correction according to the invention of the angle of traverse at the shift point, resulting from computed values.

FIG. 3: The solid line L4 shows the control signal of the control device 3 which for the deflection of the swash plate 25 of the primary unit 13 is proportional for a transmission under load with three speed ranges and the transmission ratios U1, U2, U3 in the mechanical branch of the transmission 6. The broken line L5 shows the characteristic curve of the control signal, such as known from the tests, for the swash plate 25 of the primary unit 13 during a load-free operation of the transmission 6. During the load-free operation, the gear-shift points S1 and S2 are reached at a control signal $I_{target}$. The control signal $I_{target}$ is selected as a fixed value, e.g. programmed into the control unit 3. Under load, the gear-shift points S1 and S2 are reached at a control signal $I_{actual}$, which deviates from $I_{target}$ by $\Delta I$. The difference $\Delta I$ in the required control signals results from the increased leakage in the hydrostatic branch 15 while operating under load. At the gear-shift point, the control unit 3 computes the difference $\Delta I$ from the latest control signal $I_{actual}$ given to the swash plate 25 and the preselected control signal $I_{target}$, and calculates a correction value K. The value of the control signal $I_{actual}$ reached under load is reduced by the correction value K. The correction value $K=\Delta I - V.\Delta I$, whereby V is the ratio of the two gears between which the shifting takes place in the mechanical branch 16 of the transmission 6.

We claim:

1. An arrangement for operating a continuously variable drive unit of a motor vehicle comprising:
   a controllable internal combustion engine operated predominantly with a constant rotational speed over an entire speed range of the motor vehicle;
   a hydrostatic-mechanical power split transmission with a continuously variable transmission ratio, the transmission including:
   a mechanical branch;
   a hydrostatic branch formed with:
      a primary unit having a swash plate; and
      a secondary unit with variable rotational speeds with respect to the continuously variable transmission ratio between gear-shift points of the mechanical branch; and
   an output shaft connected to the transmission; and
   a control device functioning in a manner that comprises:
   reducing a speed ($n_1$) of the internal combustion engine to a lower value before a transmission ratio of the power split transmission is reached at which the secondary unit presents its maximal rotational speed, thereby changing a signal for controlling the swash plate so that at a decreasing speed of the internal combustion engine an almost constant rotational speed is maintained at the output shaft;
   after reaching a shift point the control device modifies the control signal for the swash plate by a value calculated from a difference between a highest control signal ($I_{actual}$) and a preselected control signal ($I_{target}$) and a ratio of transmission in the mechanical branch at a shift point;
   after conclusion of a shifting operation the control device further lowers the speed of the internal combustion engine and changes the swash plate control signal so that rotational speed of the output shaft is kept almost constant;
   subsequently changing the rotational speed of the output shaft at a constant transmission ratio by increasing the speed of the internal combustion engine until the speed ($n_1$) is again reached;
   further changing the rotational speed of the output shaft at a constant speed ($n_1$) of the internal combustion engine by modifying the gear ratio of the transmission.

2. An arrangement according to claim 1 wherein the control device controls both the internal combustion engine and the power split transmission.

3. An arrangement according to claim 1 wherein the control device carries out a shifting of the transmission without lowering the speed of the internal combustion engine when the latter is operated at 90% of its peak performance.

4. An arrangement according to claim 1 wherein the control device applies a sequence of speed and transmission adjustment at 90% of the control signal ($I_{actual}$).

5. A method for operating a continuously variable drive unit of a motor vehicle, the drive unit comprising:
   a controllable internal combustion engine operated predominantly with a constant rotational speed over an entire speed range of the motor vehicle;

a hydrostatic-mechanical power split transmission with a continuously variable transmission ratio, the transmission including:
   a mechanical branch;
   a hydrostatic branch formed with:
      a primary unit having a swash plate; and
      a secondary unit with variable rotational speeds with respect to the continuously variable transmission ratio between gear-shift points of the mechanical branch; and
   an output shaft connected to the transmission; and
a control device;
the method comprising:
   reducing through the control device a speed ($n_1$) of the internal combustion engine to a lower value before a transmission ratio of the power split transmission is reached at which the secondary unit presents its maximal rotational speed, thereby changing a signal for controlling the swash plate so that at a decreasing speed of the internal combustion engine an almost constant rotational speed is maintained at the output shaft;
   modifying through the control device after reaching a shift point the control signal for the swash plate by a value calculated from a difference between the highest control signal ($I_{actual}$) and a preselected control signal ($I_{target}$) and a ratio of transmission in the mechanical branch at a shift point;
   lowering further through the control device after a conclusion of a shifting operation the speed of the internal combustion engine and changing the swash plate control signal so that rotational speed of the output shaft is kept almost constant;
   changing subsequently the rotational speed of the output shaft of a constant transmission ratio by increasing the speed of the internal combustion engine until the speed ($n_1$) is again reached; and
   further changing the rotational speed of the output shaft at constant speed ($n_1$) of the internal combustion engine by modifying the gear ratio of the transmission.

6. A method according to claim 5 wherein the control device controls both the internal combustion engine and the power split transmission.

7. A method according to claim 5 wherein the control device carries out shifting of the transmission without lowering the speed of the internal combustion engine when the latter is operated at 90% of its peak performance.

8. A method according to claim 5 wherein the control device applies speed and transmission control at 90% of the control signal ($I_{actual}$).

* * * * *